United States Patent
Galli et al.

(10) Patent No.: US 7,870,199 B2
(45) Date of Patent: Jan. 11, 2011

(54) SYSTEM AND METHOD FOR SEAMLESSLY BRINGING EXTERNAL SERVICES INTO INSTANT MESSAGING SESSION

(75) Inventors: Marcio dos Santos Galli, Mountain View, CA (US); Doron Rosenberg, Austin, TX (US)

(73) Assignee: AOL Inc., Dulles, VA (US)

( * ) Notice: Subject to any disclaimer, the term of this patent is extended or adjusted under 35 U.S.C. 154(b) by 1219 days.

(21) Appl. No.: 10/680,032

(22) Filed: Oct. 6, 2003

(65) Prior Publication Data

US 2005/0086309 A1    Apr. 21, 2005

(51) Int. Cl.
G06F 15/16    (2006.01)
(52) U.S. Cl. ....................................... 709/206
(58) Field of Classification Search ................. 709/204, 709/205, 206, 207, 229; 715/751, 758
See application file for complete search history.

(56) References Cited

U.S. PATENT DOCUMENTS

| | | | |
|---|---|---|---|
| 6,144,991 A | 11/2000 | England | |
| 6,212,548 B1 | 4/2001 | DeSimone et al. | 709/204 |
| 6,260,148 B1 | 7/2001 | Aggarwal et al. | 713/201 |
| 6,301,609 B1 | 10/2001 | Aravamudan et al. | 709/207 |
| 6,400,820 B1 | 6/2002 | Edwards et al. | |
| 6,430,602 B1 | 8/2002 | Kay et al. | 709/206 |
| 6,430,604 B1 | 8/2002 | Ogle et al. | 709/207 |
| 6,434,599 B1 | 8/2002 | Porter | 709/204 |
| 6,496,870 B1 | 12/2002 | Faustini | |
| 6,539,421 B1 | 3/2003 | Appelman et al. | 709/206 |
| 6,564,246 B1 * | 5/2003 | Varma et al. | 709/205 |
| 6,665,395 B1 | 12/2003 | Busey et al. | |
| 6,691,159 B1 | 2/2004 | Grewal et al. | |
| 6,807,562 B1 * | 10/2004 | Pennock et al. | 709/204 |
| 6,809,749 B1 | 10/2004 | Chen et al. | |
| 6,912,573 B2 | 6/2005 | Ohkado et al. | |
| 7,039,676 B1 * | 5/2006 | Day et al. | 709/204 |
| 7,089,553 B1 | 8/2006 | Glaser et al. | |
| 7,103,846 B1 | 9/2006 | Shafrir et al. | |
| 7,152,092 B2 * | 12/2006 | Beams et al. | 709/204 |
| 7,188,143 B2 * | 3/2007 | Szeto | 709/206 |
| 7,213,206 B2 * | 5/2007 | Fogg | 715/706 |
| 7,299,257 B2 | 11/2007 | Boyer et al. | |
| 7,653,692 B2 * | 1/2010 | Creamer et al. | 709/206 |
| 2002/0091768 A1 * | 7/2002 | Balasubramanian | 709/204 |
| 2003/0018725 A1 * | 1/2003 | Turner et al. | 709/206 |
| 2003/0018726 A1 | 1/2003 | Low et al. | 709/206 |
| 2003/0088623 A1 * | 5/2003 | Kusuda | 709/204 |
| 2003/0097410 A1 * | 5/2003 | Atkins et al. | 709/206 |
| 2003/0125927 A1 * | 7/2003 | Seme | 704/3 |

(Continued)

FOREIGN PATENT DOCUMENTS

KR    2002-0038974    5/2002

*Primary Examiner*—Benjamin R Bruckart
*Assistant Examiner*—Alicia Baturay
(74) *Attorney, Agent, or Firm*—Glenn Patent Group; Michael A. Glenn

(57) ABSTRACT

The invention provides a framework that allows a number of software application agents to be stacked on top of an instant messenger application. Each of the software application agents establishes a connection with a third-party Web service on the Internet or a local application in the user's computer. The user can share one or more third-party services or applications with other user(s) in an instant messaging session through the application agents.

28 Claims, 7 Drawing Sheets

U.S. PATENT DOCUMENTS

| | | |
|---|---|---|
| 2003/0140089 A1 | 7/2003 | Hines et al. |
| 2003/0177184 A1* | 9/2003 | Dickerman et al. .......... 709/204 |
| 2003/0217096 A1* | 11/2003 | McKelvie et al. ........... 709/202 |
| 2004/0015610 A1 | 1/2004 | Treadwell |
| 2004/0064696 A1 | 4/2004 | Daigle et al. |
| 2004/0078424 A1* | 4/2004 | Yairi et al. .................. 709/203 |
| 2004/0125924 A1* | 7/2004 | McMullin et al. ........ 379/88.19 |
| 2004/0174392 A1* | 9/2004 | Bjoernsen et al. ............ 345/751 |
| 2004/0181577 A1* | 9/2004 | Skurikhin et al. ............ 709/204 |
| 2004/0181579 A1* | 9/2004 | Huck et al. .................. 709/205 |
| 2004/0267531 A1* | 12/2004 | Whynot et al. ............... 704/260 |
| 2004/0267885 A1* | 12/2004 | Zimmermann et al. ....... 709/206 |
| 2005/0021652 A1* | 1/2005 | McCormack ............... 709/207 |
| 2005/0044143 A1* | 2/2005 | Zimmermann et al. ....... 709/204 |
| 2005/0049879 A1* | 3/2005 | Audu et al. .................. 704/277 |

* cited by examiner

SYSTEM AND METHOD FOR SEAMLESSLY BRINGING EXTERNAL SERVICES INTO INSTANT MESSAGING SESSION

BACKGROUND OF THE INVENTION

1. Field of the Invention

This invention generally relates to Internet based messaging system. More particularly, the invention relates to a system and method for seamlessly bringing third-party Web services or local applications into an instant messaging session between two or more online end-users.

2. Description of the Related Art

This invention aims to extend the existing messaging frameworks by external resources such as a third-party Web service or a local application into an instant messaging environment using intermediary applications.

Traditionally, a messaging system includes a messaging application programming interface (MAPI) which refers to a messaging architecture and a client interface component for applications such as e-mail, scheduling, calendaring and document management.

As a messaging architecture, MAPI provides a consistent interface for multiple application programs to interact with multiple messaging systems across a variety of hardware platforms.

MAPI supports various client applications that demonstrate different levels of messaging support, e.g. formatting text for a single message with a variety of fonts and present to users a customized view of messages that have been filtered, sorted or preprocessed.

One example of the messaging systems is NetMeeting developed by Microsoft which enables users to communicate in numerous ways such as chatting, telephoning, sharing a whiteboard for drawing, and sharing an application program. The program sharing feature allows meeting participants to view and work on files simultaneously. For example, a user may have a Microsoft Excel document that several people need to work on. The user may open the document on his computer and share it with others participants. Other participants can provide their comments directly in the document. Only the person who has opened the document is required to have the program on his computer. Other participants can work on the document without having the program. Only one person, however, can be in control of a shared program at a time.

To share a program, the user clicks the "Share Program" button, and then, in the "Sharing" dialog box, clicks the name of the program that the user wants to share. Finally, the user clicks "Share". If the users share a Windows Explorer window, such as My Computer, Control Panel, or a folder on his computer, he will be sharing all Explorer windows he has opened. Also, once he has shared such a window, every program he starts while he is still in the meeting session is shared with the other participants automatically.

To allow control of a shared program, the user just clicks "Allow Control" button in the "Sharing" dialog box; then in the main NetMeeting window, right-clicks the name of a person he wants to work in the program, and then clicks "Grant Control".

To work in a program shared by someone else, the user clicks "Request Control" on the "Control" menu of the shared program window. Only participants who have NetMeeting installed can work in a shared program. The person who shared the program must click "Allow Control" in the "Sharing" dialog box before he can click "Request Control". When the user clicks "Request Control", the person who shared the program receives a confirmation message and must click "Accept" before the user can work in the shared program. If a document is created during collaboration, only the person who shared the program can distribute the document.

Note that in the framework of NetMeeting, a user can neither bring a third-party Web service into a session without leaving the session and spending a number of navigating steps, nor bring an instant messaging session into a local application which is being used by one or both of the users in the session.

Another example is MSN Messenger, which is an instant messenger application similar to NetMeeting. The application provides a GUI from which users can enter and post textual messages. The GUI includes a number of functional links such as "invite someone to the conversation", "send a file or photo", "send e-mail", "browse the Web together", "ask for remote assistance", "start application sharing", "start whiteboard", "make a phone call", etc. In the framework of MSN Messenger, however, a user can neither bring a third-party Web service into a session without leaving the session and spending a number of navigating steps, nor bring an instant messaging session into a local application which is being used by one or both of the users in the instant messaging session.

Another example is Yahoo! Messenger, which is an instant messenger application associated with Yahoo's Internet Services. Similar to MSN Messenger, Yahoo! Messenger provides a GUI from which the users can enter and post textual messages. The GUI includes a number of functional links such as "send a file", "invite a friend to see Webcam", "invite a friend to enable voice", "invite a friend to a multi-user conference", and "select an IMVironment", etc.

Yahoo! Messenger's IMVrionment feature brings online photo sharing experience into the instant messaging session by entirely loading a graphic content into the communication window. For example, when two users are in an instant messaging session, if the first user selects a photo sharing IMVrionment, the environment on the second user is also affected and modified based on the first user's action. The major problem in Yahoo! Messenger version 5.0 is that it is vulnerable to a denial of service attack, caused by a buffer overflow in the IMvironment field of the Yahoo protocol. By sending a message containing an overly large IMvironment field using a malicious Yahoo! Messenger client, a remote attacker could overflow a buffer and cause the recipient's Messenger client to crash.

Yet another example is AOL's IM and Chat, which uses a similar GUI including a message entry box and message display box. The GUI also includes a "music share" link which takes the user to audio or audio-video programs. To share a music program, the user clicks on the icon of the "music share". The user is then returned a pop-up screen with various options. After the user clicks on an icon or title representative of a music program, a hyperlink enters the display box automatically. The selected program is then launched in the computer of the user who clicks the link.

Existing instant messaging client applications are primarily used for exchanging textual messages, and are monetized by displaying ads that add no real value to users' experience. Although some of them allow users to share Web content in a limited sense, none of them adopts a framework facilitated with easy-to-use brokerage to bring external resources, such as a third-party Web service or a local application, into an instant messaging session or even bring the instant session into the local application which is being used.

What is desired is a framework in which a third-party service on the Internet can be seamlessly incorporated into an instant messenger environment without necessarily loading the entire application interface of the third-party service, so that a user can share the chosen resource with another user during an instant messaging session.

What is further desired is that the framework enables the user to seamless bring a local application into the instant messaging session or even bring the instant messaging session into the local application.

SUMMARY OF THE INVENTION

The invention provides a rich experience instant messaging (IM) framework that allows a number of software agents, called IMLets, to be stacked on top of an instant messenger application. Each of the software agents establishes a connection with a specific third-party service on the Internet. The end users of the IM session can share one or more third-party services through the agents without need of leaving the session. In other words, the users can use the third-party services in the IM session and share the results or collaborate with the facilities offered by the services represented by the software agents.

In one preferred embodiment of the invention, the rich experience framework includes a graphical user interface which has a window for registration and activation of the software agents. The graphical user interface can be either attached to, or detached from the traditional instant messenger interface. Registration of a software agent makes it immediately stacked on the user's instant messenger application environment and thus makes a third-party service represented by the agent immediately available for the user. The user chooses one or more software agents for registration from a variety of options. A list of the options is frequently updated by the IM service provider. The user may change his registrations from time to time.

Activation of a software agent makes the third-party Web service represented by the agent immediately accessible in an IM session. The graphical user interface provides a list of the user-registered software agents. The user can activate any of them by one or more mouse-clicks or simply by dragging it to the communication window.

When the software agent is activated, the users can directly share the agent's usage results. For example, the user may activate a software agent associated with a third-party instant-translation service which enables the users to communicate using different languages without a need to load the third-party service application into the users' computers. For another example, the user may invite another user to watch a movie by inserting a movie element provided by an online movie service. Once the software agent is activated, the users can share the selected online service in the session. The data exchange between the users and the selected online service is supported by Web service interfaces, such as SOAP/XMU-HTTP, and the related protocols.

A software agent can also represent a local application in the user's computer. With assistance of the software agent, the users can not only share the application in an IM session, but can communicate to each other within the application as well.

In another preferred embodiment, the user can easily associate a visual cue, such as an icon or its alias, of a software agent with the screen name of a certain contact in the user's friend list or buddy list. Whenever the user and the contact meet in an IM session, the visual cue enters the IM environment with the contact's screen name. The user may simply, for example, click on the visual cue associated with the contact's screen name, and the service represented by the software agent is instantly brought into the IM session. A software agent's icon and its alias may appear in many different places. For example, it appears in the list of registered agents or the list of unregistered agents. It can also be spatially associated with the screen name of a contact in the contact list. When several different agents' icons or aliases are associated with one contact, the icons or aliases can be arranged in a sequence determined by the user's prior use with the contact or by the user's frequency of use, with the contact, of the third-party service represented by the application agent. When the contact's screen name appears in the instant messenger application's communication window, the associated icons or aliases come with the screen name. In this case, the user may activate the application agent by clicking the icon or alias. The contact may invite the user to activate the application agent if the contact himself has not registered the software agent.

DETAILED DESCRIPTION OF THE INVENTION

The invention provides an application program interface (API) system that allows a number of software agents to be stacked on top of an instant messaging (IM) application. Each of the software agents can establish a connection between the local resources in the user's computer and a remote distributed third-party service on the Internet. The users can share one or more third-party services through the software agents in an IM session.

Figure 1A:
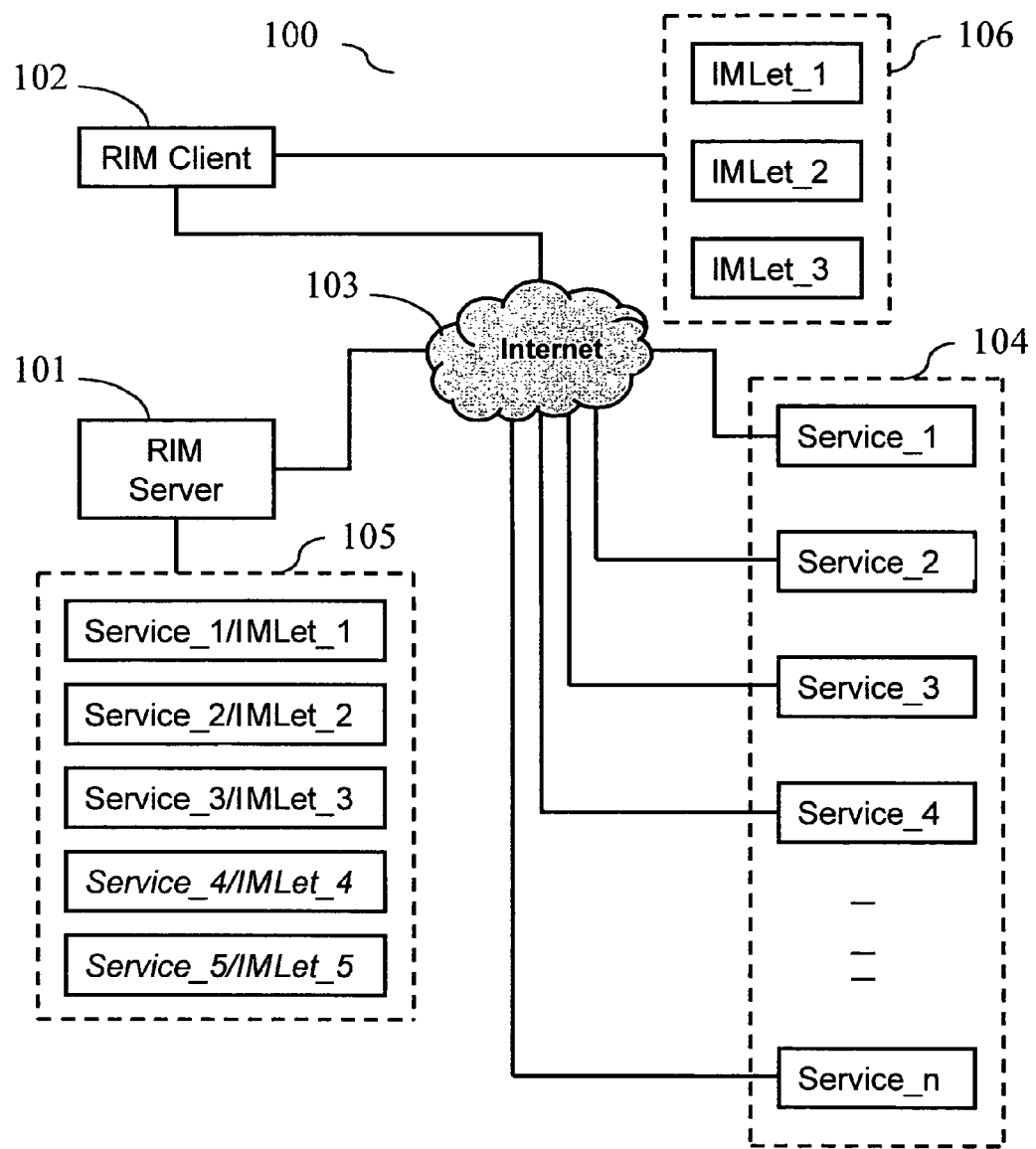
FIG. 1A is a block diagram illustrating a rich experience instant messaging (IM) system according to the invention.

FIG. 1A is a block diagram illustrating a rich experience instant messaging (RIM) system 100 according to the invention. The system includes a RIM server 101 which provides IM service and a plurality of RIM clients, e.g. RIM Client 102, running on the users' computing devices such as desktops, laptops or PDAs, etc. RIM server 101 and the users' devices are coupled to the Internet 103. There is a plurality of third-party services (Service_1 through Service_n) 104 coupled to the Internet. RIM server 101 has contracted with some third-party services, e.g. Service_1 through Service_5, 105 and provides an application agent, called IMLet, for each of the contracted services 105. The IMLet, when registered by a user of the RIM service, runs on the top of the RIM service application. The user may choose any of the IMLets supported by the RIM server 101 for registration. For example, although the RIM service supports IMLet_1 through IMLet_5, the user using RIM client 102 has only registered IMLet_1 through IMLet_3.

Figure 1B:
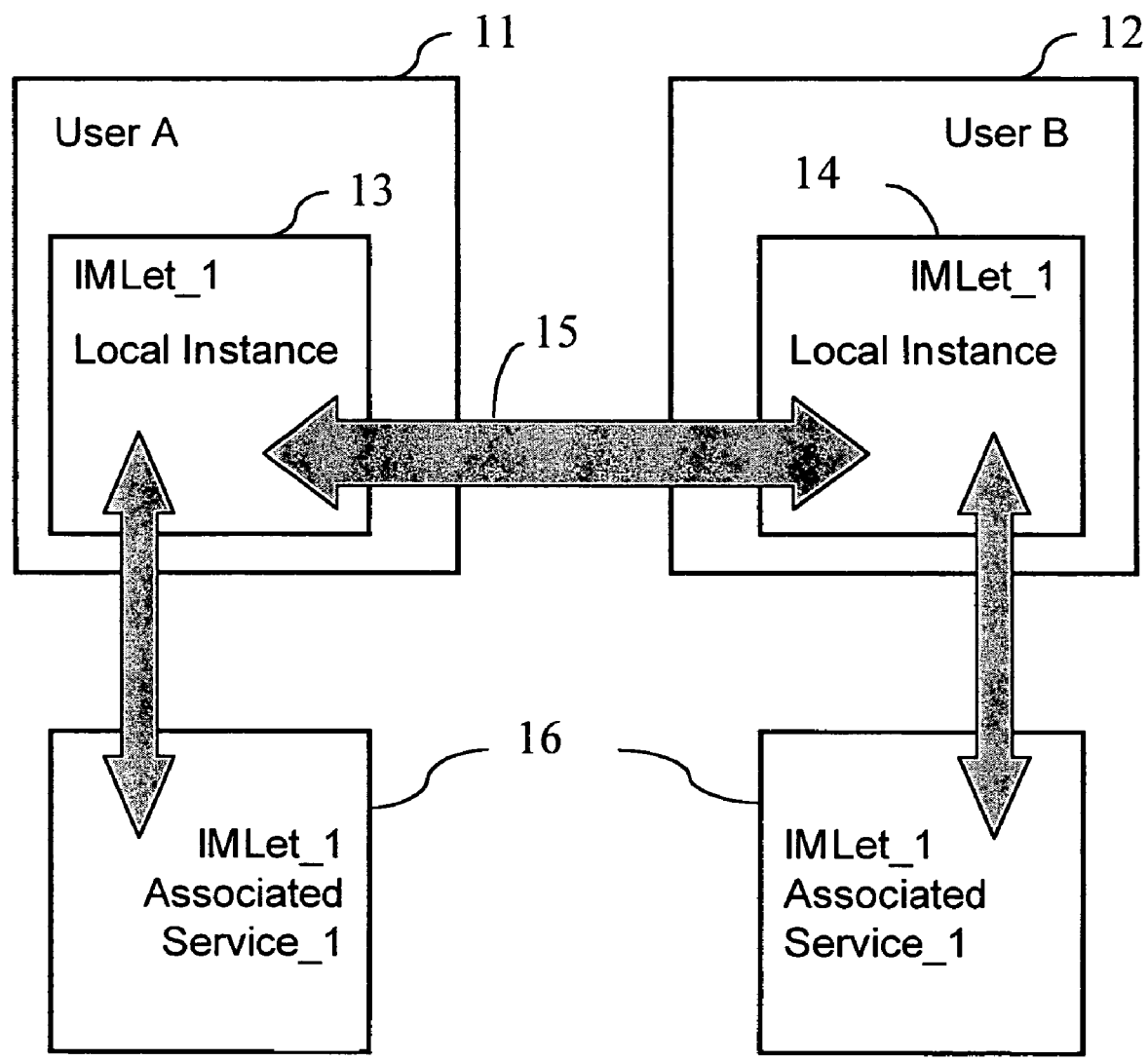
FIG. 1B is a block diagram illustrating a data flow model of the rich experience IM system of FIG. 1A.

FIG. 1B is a block diagram illustrating a data flow model of the RIM system 100 of FIG. 1A. User A at the device 11 and User B at the device 12 are communicating in an IM session 15 supported by the RIM application. User A activates an IMLet, e.g. IMLet_1, to share the associated Web service 16, i.e. Service_1, with User B. Through the IMLet_1's local instance 13 at the device 11, User A exchanges data directly with Service_1. Similarly, through the IMLet_1's local instance 14 at the device 12, User B exchanges data directly with Service_1. Note that an IMLet itself may proactively send an update to the other end. For example, User A is using a camera connection as IMLet_3, the IMLet_3 can from time to time use the channel to update the other end to notify when the camera image is available or not. The IMLet can use the IM session flow itself to address a message to the other end, e.g. to another IMLet, or can simply use its own channel of communication. When an IMLet uses the IM session flow, its application data is not displayed to the users.

An IMLet can also act as the representation of a local application exposed to the user's IM session. In this case, the users can collaborate by exchanging materials and composition resources that are produced in using the local application in the IM session. For example, via the IMLet, the users can collaborate in creating, updating, and publishing Web content to any HTML Web site. When the IMLet is activated, the represented local application can access the user's IM session to facilitate communication with the both ends. For another example, when User A is using a word processor application, he might want to communicate with User B via the word processing application, such as copying and pasting the paragraph to User B's word processor. In this situation, assume that User A is logged on the IM and the IMLet for the word processor is activated, User A can gain new menu items on the word processor interface which allows User A to share objects with User B.

In various deployments such as these illustrated hereafter, an external application, i.e. a third-party service on the Internet or a local application in the user's computing device, can be represented by more than one IMLets. In that case, one IMLet can act as the agent for a specific function of the external application. For example, when a multi-function IM bot is involved, one IMLet can be a representative of the IM bot's auto-translation function; another IMLet can be a representative of its Web search function; yet another can be a representative of its shopping function. Similarly, in a multi-lingual translation service, each language-pair, e.g. English ⇔Portuguese, Spanish ⇔Russian, etc. can be represented by a single IMLet. For another example, in an on-line music or radio service, each specific section or program can be represented by a single IMLet.

To maximize the users' IM experience, the visual cue (such as an icon or its alias) of an IMLet and the activation process for the IMLet can be incorporated in the RIM application's user interface in a user-friendly manner. For example, the user can conveniently associate one or more IMLets with a certain contact in his friend-list or buddy list. When the user and the contact meet in an IM session, the IMLets associated with the contact are already stacked on the RIM application. When the user clicks on the icon of the IMLet, the service represented by the IMLet is instantly brought into the IM session. The IMLet's icon and its alias may appear in many different circumstances. For example, it appears in the list of registered IMLets or the list of unregistered IMLets. It can also be spatially associated with the screen name of a contact in the contact list. When two or more IMLets are associated with one contact, the icons of these IMLets can be arranged in a sequence determined by the user's prior use with the contact or by the user's frequency of use, with the contact, of the third-party service represented by the IMLet. When the contact's screen name appears in the RIM application's communication window, the associated icons or aliases come with the screen name. In this case, the user may activate the IMLet by clicking the icon or alias. The contact may ask the user to activate the IMLet if the contact himself has not registered the IMLet.

In order to avoid possibility of security flaws, a protocol, deployed on top of the IM application, is required. The protocol supports the relationships among the users for the IM session, the agent, i.e. the IMLet, representative of the external entity, i.e. an application software or service, and the agent's action. This protocol adds meta-data that is pertinent to the agent for the given user session. Assume a word processor is involved, the message between User A and User B would become:

AgentFrom:Word_Processor;
AgentTo: Word_Processor;
SessionInstance: 1;
Agent_Command: Save_file;

This represents a message that was sent from, for example, the device 11, User A, via IMLet word processor, addressing the same agent on the other end (the device 12, User B). This type of agent-to-agent message using IM session works in the communication protocol level without showing as text to the users. Note that the IMLet, which operates as agent in the user's IM session, also addresses other applications on the other side via using the user's communication channel and a message protocol. Particularly, the IMLet sends encoded data via the user's message protocol. For example, when application A is addressing Application B on the other end, the data transferred can be a sequence of characters that represents binary data.

Figure 2:
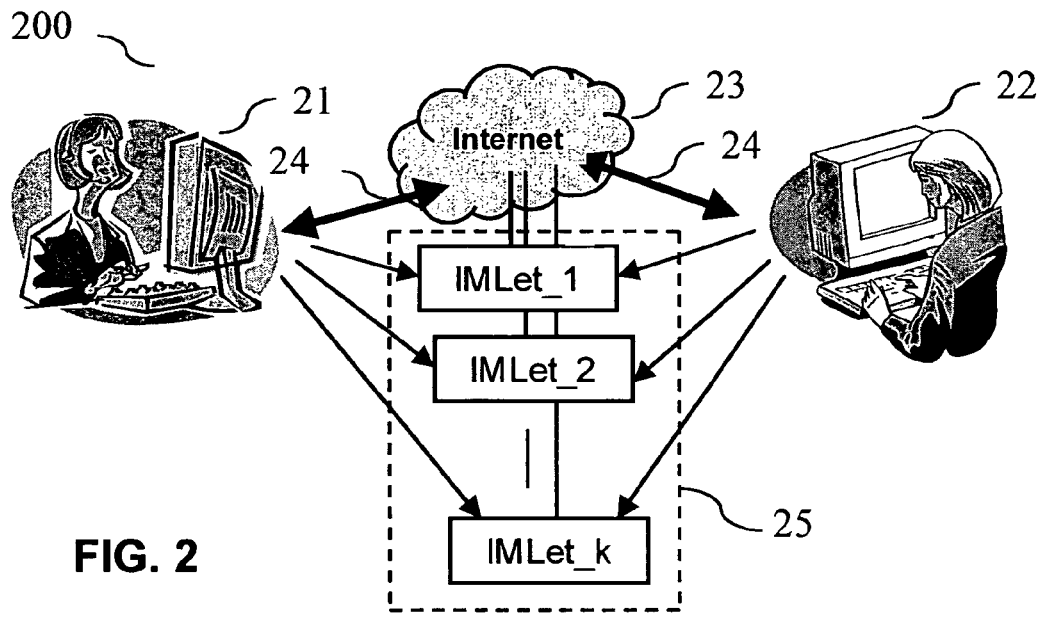
FIG. 2 is a schematic diagram illustrating an exemplary rich experience IM system according to the invention.

FIG. 2 is a schematic diagram illustrating an exemplary rich experience instant messaging system 200 according to the invention. User A at the device 21 and User B at the device 22 are communicating across the Internet 23 in an instant messaging IM) session 24. A rich experience instant messenger (RIM) application runs in each user's computing device. The RIM application provides a first graphical user interface which enables each user to enter a message and display the message in the communication window. The communication window is visible to both parties. In addition, the application provides a second graphical user interface which enables a user to register one or more software agents, i.e. the IMlets 25, from a variety of options provided by the RIM server. The second graphical user interface also enables the user to activate one or more of the user-registered IMLets in an instant messaging session. The first graphical user interface and the second graphical user interface can be either separate from each other, or combined into an integrated user interface. There is also the case, for example, where the software agent can provide a simulated interface and the user may not even realize that he is not using the IM user interface anymore, and instead, he is now using the IM session protocol infrastructure. Nevertheless, the IMLet itself may have its own user interface which does not necessarily look like the IM user interface.

The RIM application uses connectivity infrastructures such as Web services API as well as other Web based protocols and technologies to integrate third-party services into the IM session. In terms of requirements and reusability of components, the RIM application creates a placeholder environment wherein the IMLets participate in the IM session accessing the Instant Messenger API, the Web services API as well as other Web-oriented APIs.

Figure 3:
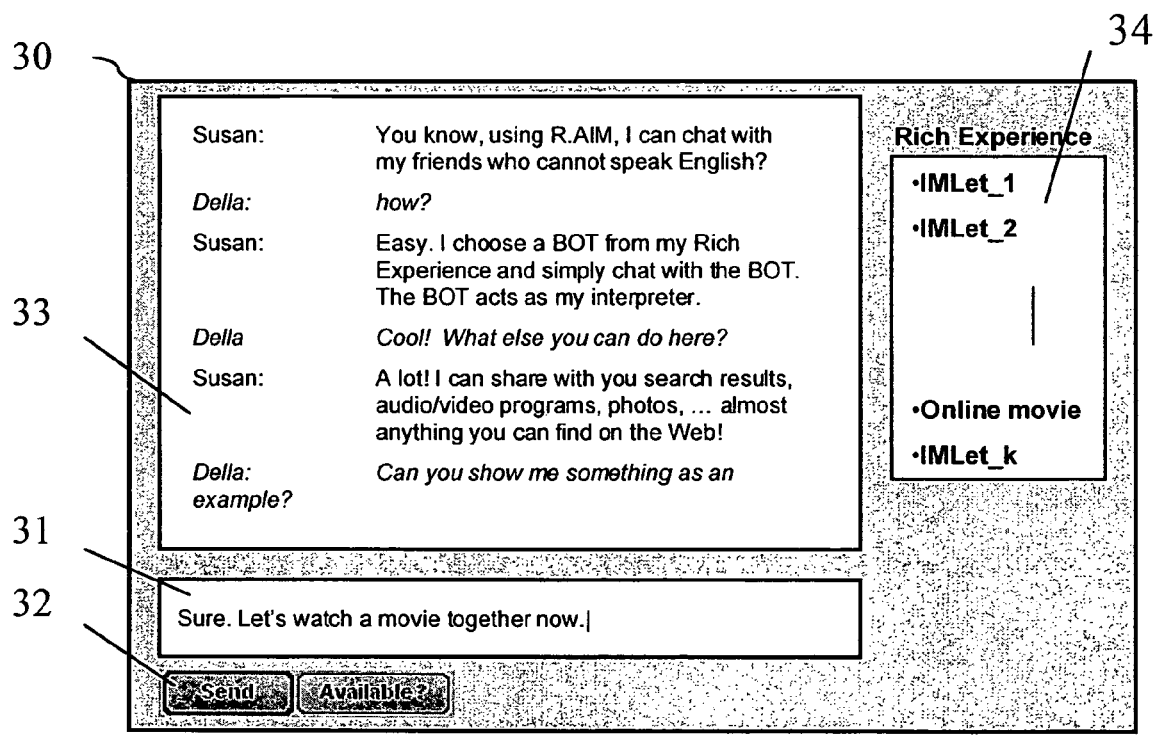
FIG. 3 is a schematic block diagram illustrating one preferred embodiment of an integrated graphical user interface of the instant messenger application according to the invention.
Figure 5A:
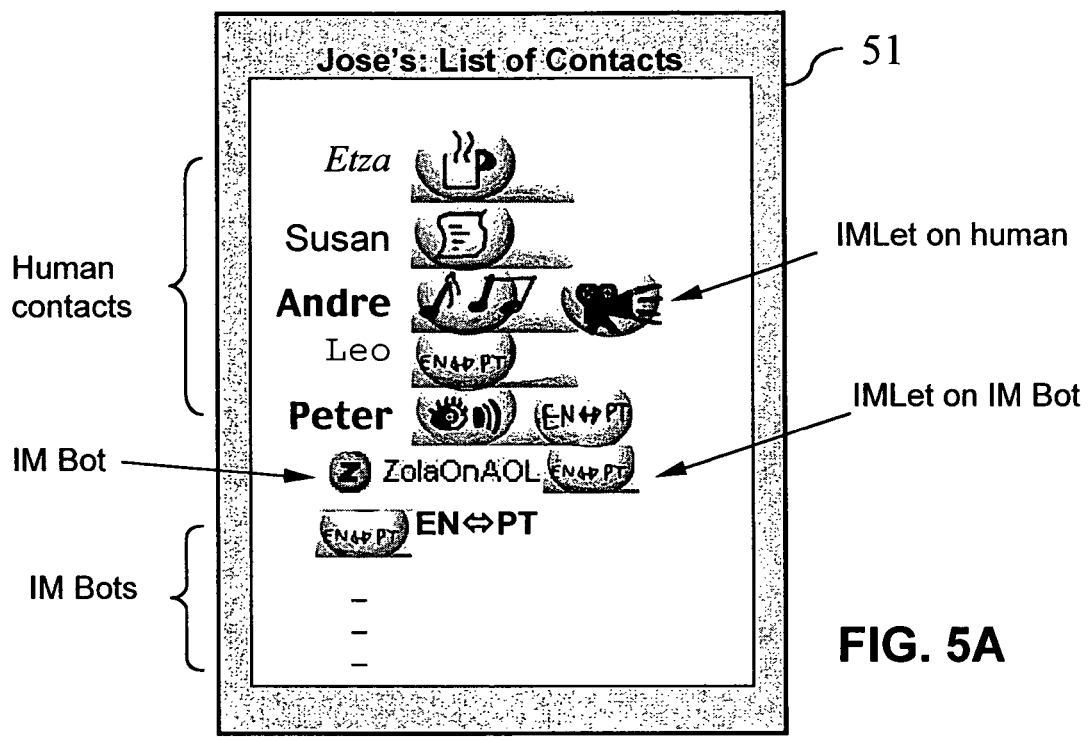
FIG. 5A is a schematic diagram showing that the icons of the user-registered software agents (IMLets) are associated with the screen names in the user's list of contacts.

In various implementations such as these described herein, the IMLets can be registered either in a separate list as illustrated in FIG. 3 or in the user's list of contact as illustrated in FIG. 5A. Upon registration by the user, an IMLet is immediately stacked in the user's instant messenger application environment and thus makes a third-party service represented by the IMLet immediately available for the user. The user chooses one or more IMLets for registration from a list of options which is frequently updated by the RIM service provider. The user may register new IMLets and unregister (unsubscribe) the registered ones at any time. The registration or unregistration can be done by a number of mouse-clicks or by dragging the icon or the title of the IMLet from the list of unregistered services to the registered services or vice versa.

Upon activation by the user, the IMLet makes the third-party service represented by the IMLet immediately accessible in the IM session. The second graphical user interface as mentioned above provides a list of IMLets registered by the user. The user can activate any of them by giving simple commands such as one or more mouse-clicks or by dragging a symbol, e.g. an icon or a title, representative of the IMLet into the communication window.

Once the IMLet is activated, the users can share the selected online service in the IM session. The data exchange between the users and the selected online service is supported by Web service interfaces, such as SOAP/XMUHTTP, and the related protocols.

In various deployments such as these illustrated herein, an IMLet can be coupled to an IM bot, which is an interactive IM user agent represented by a software application. Once the IMLet is activated, the user can communicate either in the IM's user interface or in the IM bot's user interface, depending on implementations. An example of IM bots is the ZolaonAOL supported by America Online. Using AOL instant messenger application, the user can simply add the buddy "ZolaonAOL" to his Buddy List, i.e. the list of contacts. A user can communicate with ZolaonAOL (or the screen name zola), for example, asking for what movies is playing around a specific area.

FIG. 3 is a schematic block diagram illustrating one preferred embodiment of an integrated graphical user interface 30 of the rich experience instant messenger (RIM) application according to the invention. A user types textual message in the entry box 31. Upon clicking on the send button 32, the user's message is posted in the communication window 33 which is visible to all participants of the IM session. The user may instantly share a third-party service with other participants using the rich experience window 34. From window 34, the user can access a list of unregistered IMLets and a list of registered IMLets. The user can choose any one from the unregistered IMLets for registration by giving simple commands such as one or more mouse-clicks or dragging a symbol, e.g. an icon or a title, representing the IMLet to the list of the registered IMLets. Similarly, the user can unregister or unsubscribe a registered IMLet by giving simple commands such as one or more mouse-clicks or dragging the symbol to the list of the unregistered IMLets. Note that in FIG. 3 only an exemplary list of registered IMLets is illustrated. Although the list for registered IMLets and the list for unregistered IMLets can be deployed in different forms, the essence of the structures is basically the same.

Figure 4:
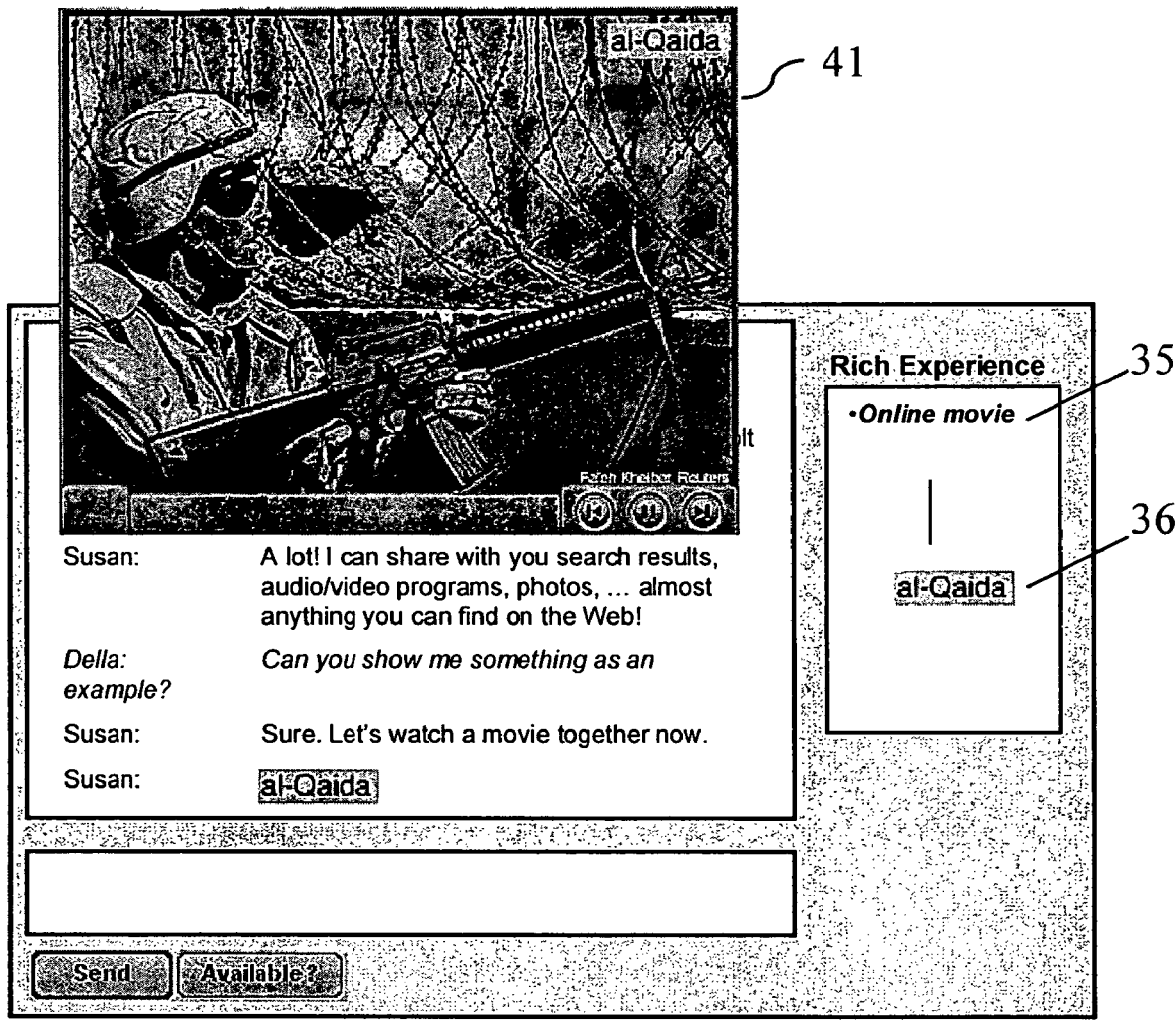
FIG. 4 is a schematic block diagram illustrating a situation where the participants of an IM session according to FIG. 3 are sharing a movie program supported by a third-party.

Now referring to FIG. 4, when Susan, one of the users, decides to share an online movie with the other user, she needs first to activate an IMLet representative of "Online Movie" 35, for example, by clicking the IMLet's icon or choosing "activation" from a pull-down menu. Then, she needs to choose a movie from a list. In the example illustrated in FIG. 4, Susan chooses the movie "al-Qaida" 36. When she clicks on the movie title, a link enters the communication window 33. When Della, the other user, clicks on the link, the movie starts on a pop-up screen 41.

Note that the IMLet can simply provide a user interface to the user. As the user clicks and chooses something, the IMLet itself is addressing the other agent directly via the IM session and the third-party application or service starts acting on top of the IM session on the user's behalf.

There are various different implementations of the activation process. In one of the implementations, when a user clicks the movie title (or an icon), the movie starts on a pop-up screen which appears in both users' computer screens at the same time.

In another implementation, when a user clicks the movie title (or an icon), a system message enters the communication window 33 (see FIG. 3). The system message may be akin to "You are invited to share <al-Qaida>. Please click anywhere of this message to start the sharing." When the invitee clicks the message, the movie starts on a pop-up screen which appears in both users' computer screen at the same time.

Yet in another implementation, the users may share a movie in a real time but non-synchronous manner. For example, when a user clicks the movie title (or an icon), the movie starts on a pop-up screen which only appears in the inviting user's computer, and at the same time a system message is posted in the communication window 33. When the invitee clicks the message or a link included in the message, the movie starts on a pop-up screen which appears in the invitee's computer screen. The users may choose to synchronize their sharing at any time.

Figure 5B:
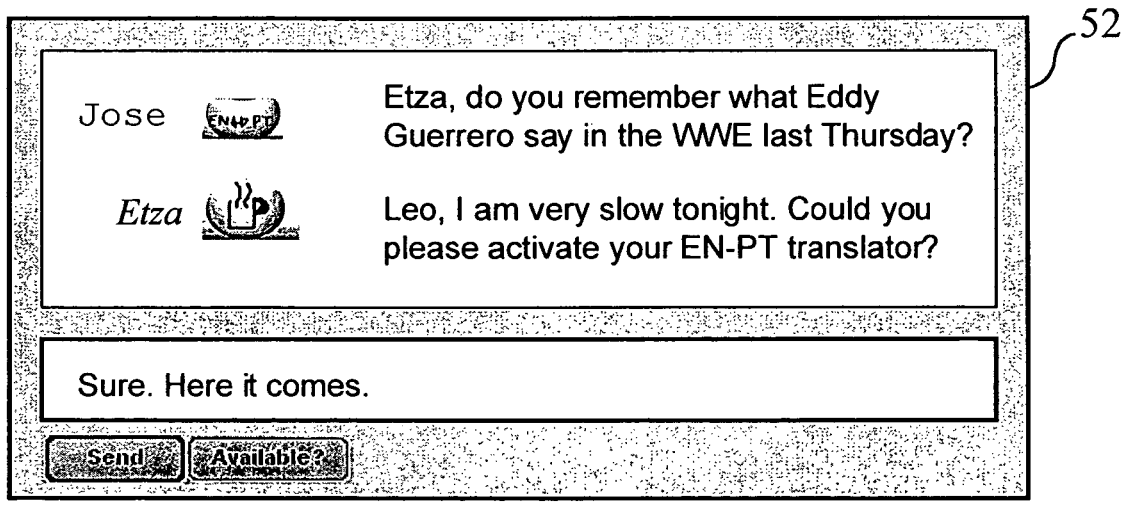
FIG. 5B is a schematic diagram showing that the icons (or the aliases) of the user-registered software agents (IMLets) are associated with the screen names in the IM session.

In various implementations such as these illustrated herein, each IMLet can be represented by a distinct visual cue such as an icon and its alias. To maximize the users' IM experience, the visual cue and the activation process for the IMLets can be incorporated in the IM application's user interface in a very convenient manner. For example, the user can easily associate one or more IMLets with a certain contact in his friend-list or buddy list. Whenever the user and a contact meet in an IM session, the IMLets associated with the contact come into the session with the contact's screen name. The user may simply, for example, click on the icon of an IMLet, and the service represented by the IMLet will be instantly brought into the IM session. An IMLet's icon and its alias may appear in many different places. For example, it appears in the list of registered IMLets or the list of unregistered IMLets. It can also be spatially associated with the name of a contact in the contact list. When several IMLets are associated with one contact, the icons can be arranged in a sequence determined by the user's prior use with the contact or by the user's frequency of use, with the contact, of the third-party service represented by the IMLet. FIG. 5A illustrates an exemplary List of Contacts (or Buddy List) 51 wherein the user (with a screen name "Jose") has five human contacts (Etza, Susan, Andre, Leo, and Peter), one IM bot, and various IMLets in his list of contacts. Etza, Susan or Leo, each has one IMLet associated. Andre or Peter each has two IMLets associated. When a contact's screen name appears in the instant messenger application's communication window as illustrated in FIG. 5B, the associated icon or alias comes with the screen name. In this case, the user (Jose), with whom an "English-Portuguese Translation" IMLet is associated, may initiate the application agent by clicking the icon "EN ⇔PT". Jose's IM partner Etza can also ask Jose to activate the application agent represented by the IMLet "EN ⇔PT" in the event Etza herself has not registered the application agent.

Note that an IMLet can be associated not only to a human contact, but also to an agent program such as an IM bot. When User A is talking to an IM bot such as ZolaOnAol, User A can choose to use an auto-translation service via an IMLet. For example, ZolaOnAol cannot understand Chinese, but a Chinese user may talk to Zola in Chinese and get Zola's responses via an IMLet which connects to an English ⇔Chinese translation service. This scenario can be further extended as below:

User A← . . . →Bot X+IMLet← . . . →User B

In this scheme, User A uses Bot X to communicate with User B or more users at the same time. Bot X acts and offers a service like a chat bot. Bot X passes User A's message to User B or vice versa. Here both users receive the benefits of the IMLet serving on Bot X in the IM session. One example is the auto-translation service as described hereafter. Another example is the service of automatically recording the communication flow. Note that all the cases are simply based on the same concept that IMLets can be attached to a human IM user or a software agent user which is an IM bot.

Figure 6:
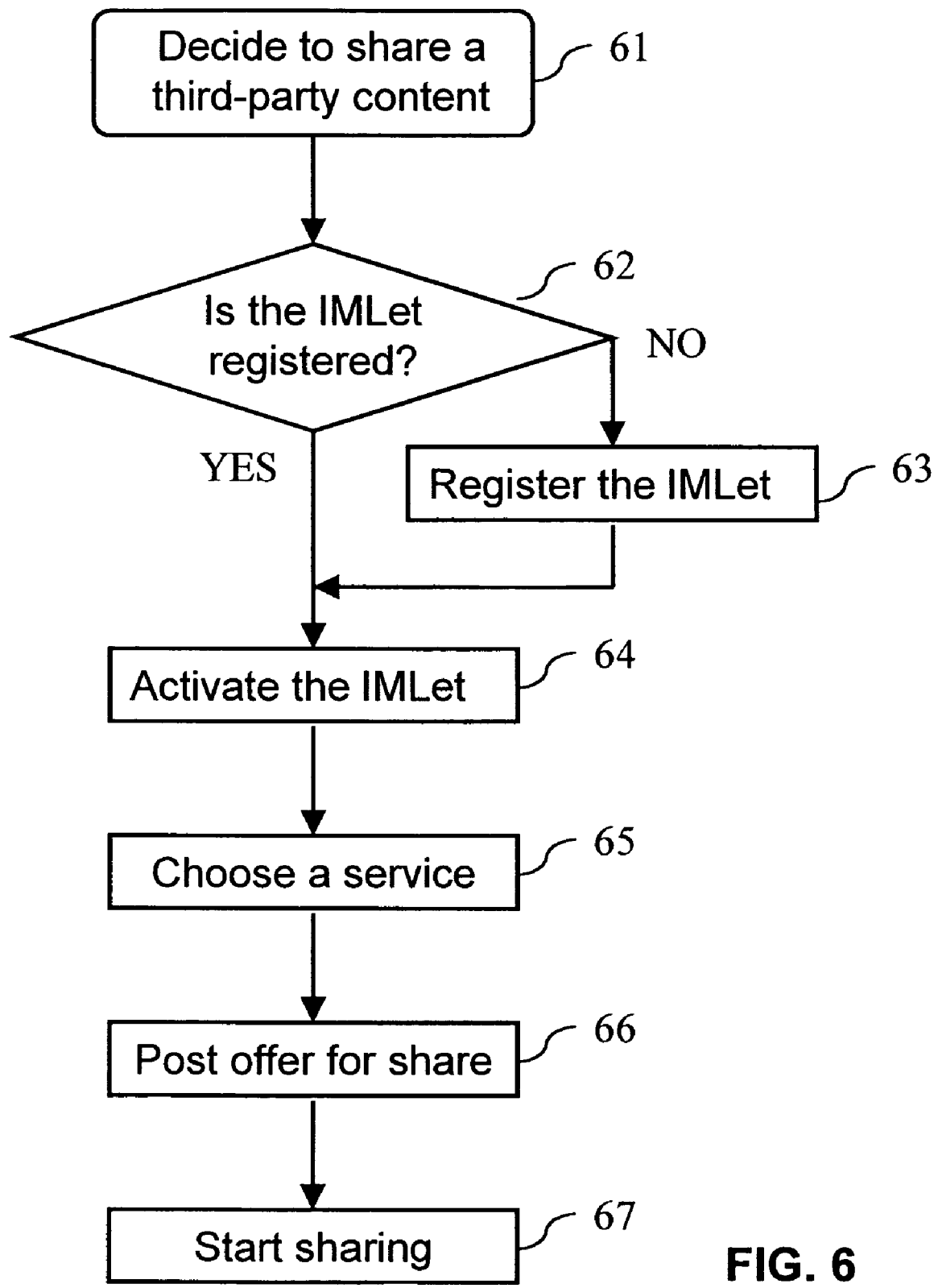
FIG. 6 is a flow diagram illustrating a method for sharing a third-party service in an IM session according to one preferred embodiment of the invention.

FIG. 6 is a flow diagram illustrating a method for sharing a third-party service in an instant messaging session according to one preferred embodiment of the invention. The method includes the steps of:

Step 61: The user decides to share with other participants in the session a third-party online service or content on the Internet or even a local application.

Step 62: The user checks whether a registered IMLet, i.e. a software agent representative of the third-party service exists.

Step 63: If the check result in Step 62 is NO, then register the IMLet and continue on Step 64. The registration may be accomplished, for example, by dragging a link or an icon from the unregistered list to the registered list, or by a number of mouse-clicks. For another example, the registration can be done through the user's personal settings or preferences. Yet for another example, in situations where the IM application can be exposed to external applications (such as a word processor) via IMLets, the user can simply query the IM application for registration.

Step 64: If the check result in Step 62 is YES, then activate the IMLet. The activation may be accomplished, for example, by a single or double clicks.

Step 65: In case the third-party service provider provides more than one service or content, the user chooses one service or content from a list of options.

Step 66: Post an invitation message to the other participant(s) to share the selected service or content.

Step 67: Upon acceptance of the invitation, the invitee may access the third-party service or content.

Note that the steps 66-67 can be optional because the message can simply be addressed between the IMLets in both sides.

In another preferred embodiment, the user activates the IMLet by dragging its name or icon to the communication window 33. When the user releases the mouse, a system message for invitation is automatically posted in the communication window 33 which is visible to the session participants. Upon the invitee's acceptance of the invitation by giving an acceptance command such as clicking on the system message or on a link included in the system message, the selected service or content becomes immediately accessible to the invitee. For some progressive content, such as audio/video programs, the users can even choose to share the content synchronously or non-synchronously.

The IMLets may be representative of many different kinds of remote contents, applications and services provided by third-parties. The following is a list with some examples other than movie sharing described above:

Real Time Chat Translation

In a chat session where users do not speak the same language, a user may choose to activate an IMLet that leverages a remote Web service to translate strings of text, such as the Babelfish Web service, so that the users can communicate seamlessly regardless of their native languages. The translation service stays active during the IM session, translating content as it is typed. The IMLet in this case is the intermediary application that filters the text that is written and connects with the translation service providing the results and plugging them into the session. The intermediary application is basically an overlay of JavaScript code that can query the translation service. It also provides a setting means from which the user chooses a language pair for translation such as "English ⇔Portuguese".

There can be many different implementations of the IMLet for instant translation. In one of the implementation, the following steps are performed:

A user activates an IMLet that represents an interactive translation-chat service with extended functionality.

The IMLet asks the user (a) whom do you want to talk? (b) What languages do you want to translate?

The user enters screen name Etza and chooses language "English ⇔Portuguese".

If Etza is not online, a message returns to the user saying Etza is not available.

If Etza is online, the user starts writing English in the entry window.

When the user clicks "SEND", the Portuguese translation of the user's message enters the communication window 33 (both the user and Etza can see the Portuguese translation).

When Etza responds in Portuguese, the English translation of Etza's message enters the communication window 33.

In a typical embodiment, the translation-chat service operates as a two-way agent. The IMLet representative of the translation-chat service sends commands to the translation-chat service, such as asking the translation-chat service to connect User A with User B. For example, an icon of EN_PT_via_Bot can be provided via the IMLet representative of the translation-chat service. So when the user clicks the EN_PT_via_Bot icon, the IMLet connects the user with the translation-chat service and commands the translation-chat service to engage with the other user.

Figure 7:
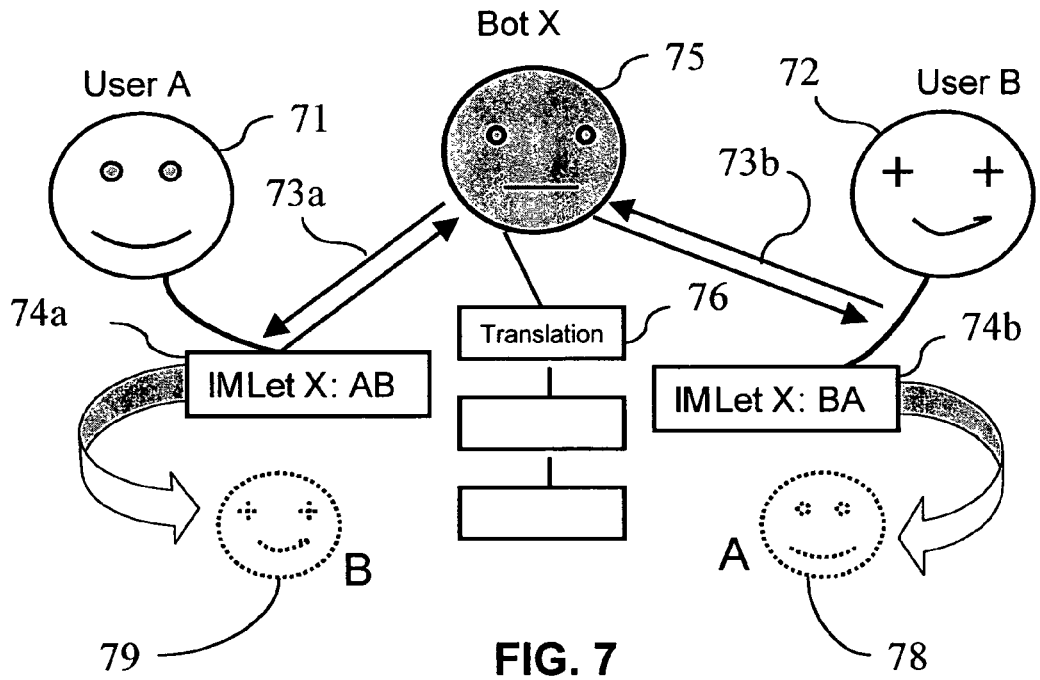
FIG. 7 is a schematic block diagram illustrating an application of the invention wherein two end-users are communicating in an IM session via an IM bot represented by a translation IMLet.

FIG. 7 illustrates an exemplary scheme wherein User A 71 and User B 72 are communicating in an IM session 73a/b. User A activates IMLet X 74 which is associated with a multi-function Bot X 75. One of its functions is automatic translation 76. IMLet X 74 (74a in User A's side, 74b in User B's side) sends to and receives messages from Bot X 75. By simple configuration, the user can activate the translation function 76. Once the translation function 76 is activated, the instant translation service is brought into the session 73a/b. In this case, the communication "User A← . . . →User B" is actually accomplished by "User A<- - - >Bot X<- - - >User B". In other words, User A communicates with Bot X and Bot X communicates with User B as illustrated by the following steps:

Amy (User A) adds the IMLet X, 74a, to her IM application;
Babee (User B) adds the same IMLet, 74b, to his IM application;
Amy->Bot X: Bot X, connect me to Babee.
Bot X->Amy: Wait.
Bot X->Babee: Amy wants to talk with you? Do you accept?
Babee->Bot X: Yes.
Bot X establishes the association of Amy-Babee and is ready for routing messages.
Bot X->Amy: You're now talking with Babee.
Amy->bot X: Hi Babee!
Bot X->Babee: Hi Babee!
Babee->bot X: Hey how are ye?
Bot X->Amy: Hey how are ye?
So Amy and Babee are now engaging into a conversation in English. Suddenly, Babee wants translation:
Babee->Bot X: Bot X, set translation English-Portuguese.
Bot X->Babee: Okay. Now messages you send to Amy will be in Portuguese.
Babee->Bot X: Amy, do you like Brazil?
Bot X->Amy: Amy, voce gosta do Brasil?

Note that Babee can always set Bot X and request Bot X to associate a third-party. When Babee says "Bot X, set translation to English-Portuguese", the Bot X associates and activates the third-party translation software 76. In a typical implementation, when User A and User B are chatting via Bot X, User A should be able to see a virtual representation of User B such as the icon 79, and User B should be able to see a virtual representation of User A such as the icon 78. The IMLet here is actually the helper application that eliminates the need of all the specific commands to the translation bot because the IMLet can do that "hidden messages" with third-party applications, e.g. the translation bot herein, and thus can simplify the processes required.

Speech Synthesis

Figure 8:
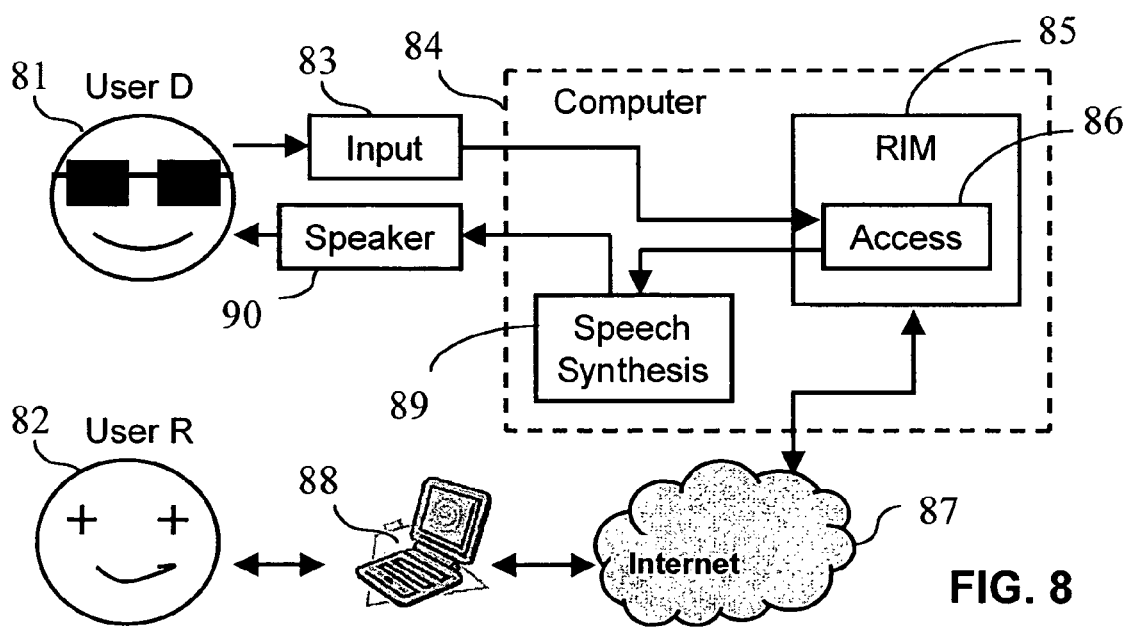
FIG. 8 is a schematic block diagram illustrating an application of the invention wherein a visually disabled user and a regular user are communicating in an IM session via a speech synthesis system represented by a speech synthesis IMLet.

The speech synthesis services specifically designed for helping users with disabilities can also be stacked on the instant messenger application using one or more IMLets. This case is similar to the translation scenario described above. Some people need translation service because they might not be able to communicate in a foreign language. Similarly, some people need speech synthesis service because they might have visual disabilities. One example of the speech synthesis services is a screen reader which helps the disabled to read Web pages. In the rich experience instant messaging system according to this invention, one or more IMLets representative of the speech synthesis services can be registered and activated. The IMLets, together with other speech-enabled software applications, help the visually disabled to communicate in an IM session. FIG. 8 illustrates a rich experience instant messaging (RIM) system which enables a visually disabled user 81 (User D) to communicate with other regular IM user 82 (User R). User D 81 needs an input interface 83 such as a key board or a speech enabled input device to communicate with the computer 84 on which the RIM application 85 runs. There is also an accessibility agent 86 which is an IMLet stacked on the RIM application 85. The accessibility agent 86 helps the visually disabled user to access the RIM application 85 and communicates to User R via the Internet 87 and User R's computer 88. The accessibility agent 86 works with the speech synthesis application 89 to provide understandable responses to User D 81 via the speaking system 90.

Note that this scheme is useful in helping various entities to be in compliance with Federal law relating to accessibility for disabled, e.g. Section 508 of the Rehabilitation Act. Section 508 requires that Federal agencies' electronic and information technology is accessible to users with disabilities. Using the IMLet-extended instant messaging system, governmental and private entities can provide on-line answers and support to more users than before.

Automatic Publishing

During an instant messaging session, a conversation can be published to a Web log service via an IMLet specifically implemented for this purpose.

Picture Sharing

An IMLet for picture sharing service may be incorporated into the instant messenger system. The IMLet leverages the existing Web services and enable sharing of the pictures in an instant messaging session.

Map Sharing

An IMLet for map reference sharing may be incorporated into the instant messenger system. The IMLet leverages the existing Web services and enable users to query and share data (driving directions to an event, map of a location) from Web-based map service providers, such as mapquest.

Other Applications

The framework according to this invention adds value by giving the user the ability to share and compose data beyond text, images or Web links. All the content, applications and services that provided via many different IMLets become pieces that can be composed creating rich composition. Users are able to compose content that can be interactive and connect with content providers or online services.

The framework can also be used with other environments than instant messenger environments. For example, IMLets can be used as assistant tools during the authoring of information, such as Weblogs. During a blog publishing authoring session, a user can use an assistant application, such as an IMLet, to insert a rich content provided by a third-party online service. Another example is to insert a content provided by a third-party online service during the composition of e-mail. A user may be interested in inserting stock quotes. Instead copying and pasting from a Web site (the user has to leave the email application to do so), the user can simply query the Stock Quote IMLet and insert the result into the composition via a single click.

In view of the many possible embodiments to which the principles of this invention may be applied, it should be recognized that the embodiments described herein with respect to the drawings are meant to the illustrative only and should not be taken as limiting the scope of the invention. One skilled in the art will readily appreciate that other applications may be substituted for those set forth herein without departing from the spirit and scope of the present invention.

Accordingly, the invention should only be limited by the Claims included below.

The invention claimed is:

1. A system for providing real-time instant messaging over a global network in a session between two or more users, each of said two or more users using a device communicatively coupled to the global network, said system comprising:
a client messaging application which runs on each of a plurality of user devices, at least two of said user devices including a user device screen, said client messaging application providing a user interface displayed on each of said user device screens, said user interface comprising:
- a message entry window for a user to enter data;
- a communication window for displaying messages entered in said session; and
- a selection window for accessing one or more application agents associated with on-line messaging service applications, wherein each application agent is represented by an icon in said selection window; and an applet operatively coupled to said client messaging application which establishes a connection to said on-line messaging service application, wherein said messaging service applications include each of:
- a translation service application, said translation service application configured to translate content as it is typed into said message entry window without having to locally run an executable application, thus providing an enriched communication session beyond simple, replicated text message content;
- a speech synthesis application configured to:
  - recognize the speech of a visually-impaired user;
  - synthesize the recognized speech into synthesized text;
  - send the synthesized text to a destination user;
  - read the screen of a visually-impaired user upon receipt of return text from said destination user;
  - translate said return text into a human-understandable audio signal; and
  - broadcast said audio signal to said visually-impaired user via a speaker;
- an automatic blog publishing application configured to publish a blog entry to the blog of any of said two or more users;
- a picture sharing application configured to share digital pictures between any of said two or more users; and
- a map sharing application configured to share digital maps between any of said two or more users;

wherein when one of said one or more application agents is activated, at least one of said on-line messaging service applications represented by said one or more activated application agents is activated to run in conjunction with said client messaging application such that said two or more users in said session can utilize said on-line messaging service applications without leaving said session; and wherein when one of said one or more application agents is activated, a visual cue appears next to the icon of the activated agent in said selection window, wherein said visual cue is suggestive of the function of the agent.

2. The system of claim 1, wherein said activated application agent addresses said on-line translation service application on an other side of said session via a message protocol.

3. The system of claim 2, wherein data transferred via said message protocol for addressing said on-line translation service application on said other side of said session is a sequence of characters that represents binary data.

4. The system of claim 1, wherein whenever said contact joins said session, said application agents represented by said one or more distinct visual cues associated with said contact are automatically activated.

5. The system of claim 1, wherein any of said application agents can be registered as a contact in said contact list of said user to create registered application agents.

6. The system of claim 5, wherein at least one of said registered application agents is associated to an interactive service.

7. The system of claim 6, wherein one or more of said registered application agents can be run in conjunction with said interactive service associated with said at least one registered application agent.

8. The system of claim 1, wherein said selection window displays any of:
- a list of unregistered application agents, each of said unregistered application agents being available to be registered with said client messaging application; and
- a list of registered application agents, each of said registered application agents being immediately available to be activated by a user.

9. The system of claim 8, wherein said user can register said unregistered application agent by dragging a symbol representative of said unregistered application agent from said list of unregistered application agents to said list of registered application agents.

10. The system of claim 9, wherein said symbol is an icon or a title.

11. The system of claim 9, further comprising:
means for associating an alias of said symbol to a contact in said user's contact list, said association based on said user's prior use with said contact, of said application agent represented by said symbol.

12. The system of claim 8, wherein said user can unregister a registered application agent by dragging a symbol representative of said registered application agent from said list of registered application agents to said list of unregistered application agents.

13. The system of claim 8, wherein said user can register an unregistered application agent by applying one or more mouse-clicking commands.

14. The system of claim 8, wherein said user can activate a registered application agent by dragging a symbol representative of said registered application agent from said selection window to said communication window.

15. The system of claim 14, wherein said symbol is an icon or a title.

16. The system of claim 8, wherein said user can activate a registered application agent by applying one or more mouse-clicking commands.

17. The system of claim 8, wherein said user can activate a registered application agent from a local application.

18. The system of claim 8, wherein said list of unregistered application agents is automatically updated by said client messaging application.

19. The system of claim 1, further comprising:
wherein a user invites another user to activate one of said application agents in said session.

20. The system of claim 1, wherein said user interface further comprises:
a symbol for selection by a user to initiate synchronous sharing of a service represented by an activated application agent.

21. A method for incorporating external resources into an instant messaging session supported by an instant messaging system, said instant messaging system comprising a client messaging application which runs on devices communicatively coupled to the Internet, comprising the steps of:
providing through said client messaging application which runs on each of plurality of user devices, user interfaces displayed on each device's screen from which a user communicates with another user, said user interface comprising:

a message entry window for said user to enter data, a communication window for displaying messages entered in said instant messaging session, and a selection window for accessing one or more application agents, each of said application agents being associated with on-line messaging service application, wherein each application agent is represented by an icon in said selection window, the method further comprising the steps of:

activating an application agent from a list of available application agents including each of:

a translation service application, said translation service application configured to translate content as it is typed into said message entry window without having to locally run an executable application, thus providing an enriched communication session beyond simple, replicated text message content;

a speech synthesis application configured to:

recognize the speech of a visually-impaired user;

synthesize the recognized speech into synthesized text:

send the synthesized text to a destination user;

read the screen of a visually-impaired user upon receipt of return text from said destination user;

translate said return text into a human-understandable audio signal; and broadcast said audio signal to said visually-impaired user via a speaker;

an automatic blog publishing application configured to publish a blog entry to the blog of any of said two or more users;

a picture sharing application configured to share digital pictures between any of said two or more users; and a map sharing application configured to share digital maps between any of said two or more users;

sharing said on-line translation service application between at least two users in said instant messaging session.

22. The method of claim 21, wherein at least one of said registered application agents is associated to an interactive service.

23. The method of claim 21, further comprising the steps of:

registering an unregistered application agent by dragging a symbol representative of said unregistered application agent from a list of unregistered application agents to said list of registered application agents, wherein each of said unregistered application agents is available to be registered with said client messaging application; and unregistering a registered application agent by dragging a symbol representative of said registered application agent from said list of registered application agents to said list of unregistered application agents.

24. The method of claim 21 further comprising the steps of:

registering an unregistered application agent by applying a number of mouse-clicking commands; and unregistering a registered application agent by applying a number of mouse-clicking commands.

25. The method of claim 21, further comprising the step of:

associating one or more visual cues to a contact in a contact list of a user, each of said one or more visual cues representing one of said registered application agents, said association based on said user's prior use or use frequency, with said contact, of said registered application agents.

26. The method of claim 25, further comprising the step of:

automatically activating said registered application agents represented by said associated visual cues whenever said contact joins said instant messaging session.

27. The method of claim 25, wherein said contact can be any of:

a screen name representing a human contact;

a name or a visual cue representing an interactive service; and a name or a visual cue representing one of said registered application agents.

28. A system for providing real-time instant messaging over a global network in a session between two or more users, each of said two or more users using a device communicatively coupled to the global network, said system comprising:

a client messaging application which runs on each of a plurality of user devices, at least two of said user devices including a user device screen, said client messaging application providing a user interface displayed on each of said user device screens, said user interface comprising:

a message entry window for a user to enter data;

a communication window for displaying messages entered in said session; and a selection window for accessing one or more application agents associated with on-line messaging service applications, wherein each application agent is represented by an icon in said selection window; and;

an applet operatively coupled to said client messaging application which establishes a connection to said on-line messaging service application, wherein said messaging service applications include each of:

a translation service application, said translation service application configured to translate content as it is typed into said message entry window without having to locally run an executable application, thus providing an enriched communication session beyond simple, replicated text message content;

a picture sharing application configured to share digital pictures between any of said two or more users; and a speech synthesis application; and an automatic blog publishing application configured to publish a blog entry to the blog of any of said two or more users;

wherein when one of said one or more application agents is activated, at least one of said on-line messaging service applications represented by said one or more activated application agents is activated to run in conjunction with said client messaging application such that said two or more users in said session can utilize said on-line messaging service applications without leaving said session; and wherein when one of said one or more application agents is activated, a visual cue appears next to the icon of the activated agent in said selection window, wherein said visual cue is suggestive of the function of the agent.

* * * * *